(12) United States Patent
Popovici et al.

(10) Patent No.: US 8,762,389 B1
(45) Date of Patent: Jun. 24, 2014

(54) SYNONYM IDENTIFICATION BASED ON SEARCH QUALITY

(75) Inventors: Dan Popovici, Cupertino, CA (US); Robert Spalek, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 11 days.

(21) Appl. No.: 13/365,181

(22) Filed: Feb. 2, 2012

(51) Int. Cl.
*G06F 17/30* (2006.01)
(52) U.S. Cl.
USPC .......................................... 707/748; 707/750
(58) Field of Classification Search
USPC ................... 707/748–750, 765–767
See application file for complete search history.

(56) References Cited

U.S. PATENT DOCUMENTS

| 7,523,099 | B1* | 4/2009 | Egnor et al. | 1/1 |
|---|---|---|---|---|
| 7,630,972 | B2* | 12/2009 | Ott et al. | 1/1 |
| 7,984,048 | B2* | 7/2011 | Curtis et al. | 707/728 |
| 8,145,623 | B1* | 3/2012 | Mehta et al. | 707/713 |
| 2009/0144262 | A1* | 6/2009 | White et al. | 707/5 |

* cited by examiner

*Primary Examiner* — Monica Pyo
(74) *Attorney, Agent, or Firm* — Fish & Richardson P.C.

(57) ABSTRACT

Methods, systems, and apparatus, including computer programs encoded on a computer storage medium, for obtaining one or more first search results that were generated for a search query; determining a score associated with the first search results; revising the search query using a query revision rule; obtaining one or more second search results that were generated for the revised search query; determining a score associated with the second search results; and evaluating the query revision rule by comparing the score associated with the first search results with the score associated with the second search results.

24 Claims, 5 Drawing Sheets

SYNONYM IDENTIFICATION BASED ON SEARCH QUALITY

BACKGROUND

This specification generally relates to search engines, and one particular implementation relates to evaluating synonyms or synonym rules that are used in revising search queries.

Search engines identify resources that are responsive to search queries. A search engine may, for example, match query terms or synonyms of the query terms with terms that occur in the resources, or with terms that occur in metadata associated with the resources.

SUMMARY

In general, one aspect of the subject matter described in this specification may be embodied in methods that compare a score assigned to search results of a query to a score assigned to search results of a revised version of the query. If the comparison reflects that the revision had a positive impact on the search results, the revision is reused on other queries.

In general, another aspect of the subject matter described in this specification may be embodied in methods that obtain search results for an original search query, as well as a query-dependent score and rank information for each search result. An aggregate score associated with search results is determined using the query-dependent scores and the rank information for the search results. The original search query is revised to include a candidate synonym for one or more query terms of the original search query. Search results are obtained for the revised search query, as well as a query-dependent score and rank information for each search result. Another aggregate score associated with search results for the revised search query is determined using the query-dependent scores and the rank information of the search results. The aggregate score associated with the search results for the original search query is compared with the aggregate score associated with the search results for the revised query. If the difference between the aggregate score associated with search results for the original search query and the aggregate score associated with the search results for the revised search query satisfies a specified threshold, the candidate synonym is designated as a synonym for the corresponding query term or terms of the original search query.

In general, another aspect of the subject matter described in this specification may be embodied in methods that obtain search results for an original search query, including a score and a rank for each search result responsive to the original search query. The methods determine a score associated with search results for the original search query using the scores and corresponding ranks of the search results. The methods revise the original search query. The methods obtain search results for the revised search query, including a score and a rank for each search result responsive to the revised search query. The methods determine a score associated with search results for the revised search query using the scores and corresponding ranks of the search results. If the difference in the score associated with search results for the original search query and the score associated with the search results for the revised search query satisfies a specified threshold, the query revision is identified as a good revision for the original search query.

In general, one aspect of the subject matter described in this specification can be embodied in methods that include the actions of obtaining one or more first search results that were generated for a search query that includes a first query term; determining a score associated with the first search results; revising the search query to include a second query term; obtaining one or more second search results that were generated for the revised search query; determining a score associated with the second search results; and comparing the score associated with the first search results with the score associated with the second search results and, in response, determining whether the second query term is a synonym for the first query term. Other embodiments of this aspect include corresponding systems, apparatus, and computer programs, configured to perform the actions of the methods, encoded on computer storage devices.

These and other embodiments can each optionally include one or more of the following features. Obtaining one or more first search results that were generated for a search query that includes a first query term includes: obtaining ranking information associated with the one or more first search results; and obtaining popularity scores associated with the one or more first search results, wherein a popularity score reflects the popularity of a search result in connection with the search query. Obtaining ranking information associated with the one or more first search results comprises obtaining a rank for each of the one or more first search results, wherein the rank indicates a display order of a search result with respect to the one or more first search results. The search query that includes the first query term is generated using queries stored in a query log.

Obtaining one or more second search results that were generated for the revised search query includes: obtaining ranking information associated with the one or more second search results; and obtaining popularity scores associated with the one or more second search results, wherein a popularity score reflects the popularity of a search result in connection with the revised search query. Obtaining ranking information associated with the one or more second search results includes obtaining a rank for each of the one or more second search results, wherein the rank indicates a display order of a search result with respect to the one or more second search results.

Determining a score associated with the first search results includes: determining position scores for the one or more first search results, wherein a position score is determined using a search result popularity score and a rank for the search result; and combining the position scores for the one or more first search results. Determining a score associated with the second search results includes: determining position scores for the one or more second search results, wherein a position score is determined using a search result popularity score and a rank for the search result; and combining the position scores for the one or more second search results.

Comparing the score associated with the first search results with the score associated with the second search results and, in response, determining whether the second query term is a synonym for the first query term includes: calculating a difference between the score for the search query and the score for the revised search query; and determining whether the difference satisfies a specified threshold.

In general, another aspect of the subject matter described in this specification can be embodied in methods that include the actions of obtaining one or more first search results that were generated for a search query; determining a score associated with the first search results; revising the search query using a query revision rule; obtaining one or more second search results that were generated for the revised search query; determining a score associated with the second search results; and evaluating the query revision rule by comparing the score associated with the first search results with the score associated with the second search results. Other embodiments of this aspect include corresponding systems, apparatus, and computer programs, configured to perform the actions of the methods, encoded on computer storage devices.

These and other embodiments can each optionally include one or more of the following features. Obtaining one or more first search results that were generated for a search query includes: obtaining ranking information associated with the one or more first search results; and obtaining popularity scores associated with the one or more first search results, wherein a popularity score reflects the popularity of a search result in connection with the search query. Obtaining ranking information associated with the one or more first search results comprises obtaining a rank for each of the one or more first search results, wherein the rank indicates a display order of a search result with respect to the one or more first search results. The search query that is generated using queries stored in a query log.

Obtaining one or more second search results that were generated for the revised search query includes: obtaining ranking information associated with the one or more second search results; and obtaining popularity scores associated with the one or more second search results, wherein a popularity score reflects the popularity of a search result in connection with the revised search query. Obtaining ranking information associated with the one or more second search results comprises obtaining a rank for each of the one or more second search results, wherein the rank indicates a display order of a search result with respect to the one or more second search results.

Determining a score associated with the first search results includes: determining position scores for the one or more first search results, wherein a position score is determined using a search result popularity score and a rank for the search result; and combining the position scores for the one or more first search results. Determining a score associated with the second search results includes: determining position scores for the one or more second search results, wherein a position score is determined using a search result popularity score and a rank for the search result; and combining the position scores for the one or more second search results. Evaluating the query revision rule by comparing the score associated with the first search results with the score associated with the second search results includes: calculating a difference between the score for the search query and the score for the revised search query; and determining whether the difference satisfies a specified threshold.

Particular embodiments of the subject matter described in this specification can be implemented so as to realize one or more of the following advantages. Search queries can be revised to obtain more relevant search results. A synonym can be identified for one or more query terms contained in an original search query based on the quality of search results that are obtained in response to the original search query and search results that are obtained in response a revised search query that contains a candidate synonym. Search results responsive to the revised search query can be obtained to provide more relevant search results. A query revision can be evaluated for an original search query based on the quality of search results that are obtained in response to the original search query and search results that are obtained in response a revised original search query.

The quality of a candidate synonym can be evaluated based on the quality of search results that are obtained in response to a revised search query that contains the candidate synonym, without a need for human feedback or rating of the search results. The quality of a query revision can be evaluated based on the quality of search results that are obtained in response to the revised search query, without a need for human feedback or rating of the search results.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
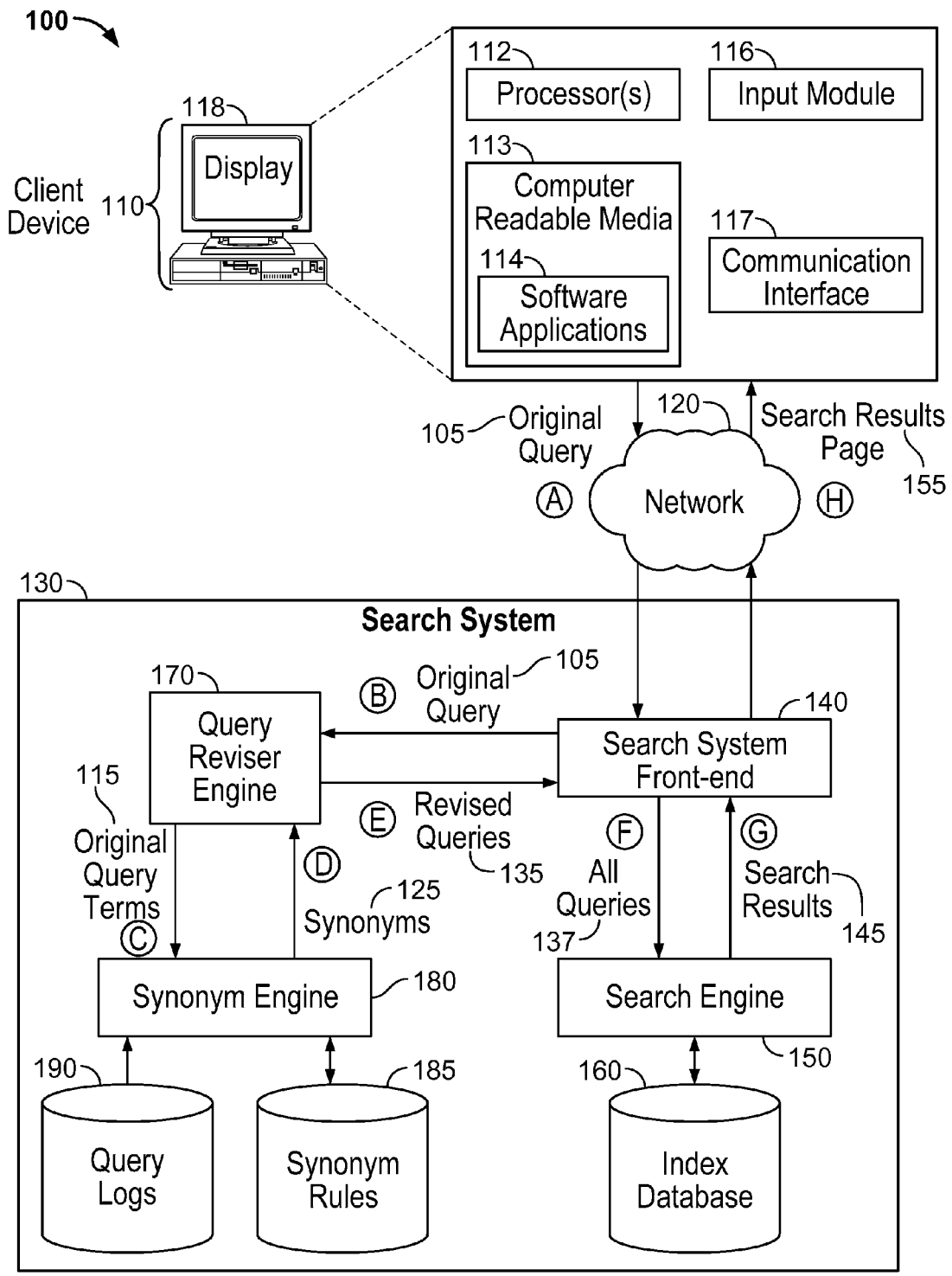
FIG. 1 is a block diagram illustrating an example system that can revise queries using synonyms.

FIG. 1 is a diagram of an example system 100 that can revise queries using synonyms. In general, the system 100 includes a client device 110 coupled to a search system 130 over a network 120. The search system 130 includes a search engine 150, a query reviser engine 170, and a synonym engine 180. The search system 130 receives a query 105, referred to by this specification as the "original search query" or an "initial query," from the client device 110 over the network 120. The search system 130 provides a search results page 155, which presents search results 145 identified as being responsive to the query 105, to the client device 110 over the network 120.

In some implementations, the search results 145 identified by the search system 130 can include one or more search results that are identified as being responsive to queries that are different than the original search query 105. The search system 130 can generate or obtain other queries in numerous ways, e.g., by revising the original search query 105.

In some implementations, the search system 130 can generate a revised search query by adding to the original search query 105 additional terms that are synonyms of one or more terms that occur in the original search query 105. In other implementations, the search system 130 can generate a revised search query by substituting terms that are synonyms of terms that occur in the original search query 105, in place of the terms in the original search query 105. The synonym engine 180 can determine the additional terms that are candidate synonyms for the one or more terms that occur in the original search query. The query reviser engine 170 can generate the revised search query. The search engine 150 can use the original search query 105 and the revised queries to identify and rank search results. The search engine 150 can provide the identified search results 145 to the client device 110 on the search results page 155.

A synonym can also be referred to as a "substitute term." Additionally, a "synonym rule" can also be referred to as a "term substitution rule."

The synonym engine 180 can identify the synonyms that the query reviser engine 170 can use to generate revised queries by evaluating terms included in previously received queries stored in a query logs database 190. The queries stored in the query logs database 190 can include previous queries in which a user considered the results of the queries desirable. For example, the user can click the provided search results from a query, in effect, validating the search results. The queries stored in the query logs database 190 can include previous queries determined to provide desirable results by the search system 130. For example, the search system 130 can perform a quality thresholding for returned search results from a query. The quality thresholding can include determining search results that have historically been returned for a particular query, and filtering those results that do not satisfy predetermined quality criteria. Search results above the quality threshold can validate a query, which the search system 130 can then include in the query logs database 190.

Given a first term ("cat"), the synonym engine 180 can evaluate terms ("feline" or "banana") that are candidate synonyms for the original term. In addition, the synonym engine 180 can determine that certain terms are synonyms of the first term (as in the case of "feline"), and that other terms are not synonyms of the first term (as in the case of "banana"). The synonym engine 180 can base this determination on rules stored in a synonym rules database 185. For example, a synonym rule can be "feline" is a synonym for cat and "banana" is not a synonym for cat.

The search system 130 can define synonym rules to apply generally, or to apply only when particular conditions, or "query contexts," are satisfied. For example, the query context of a synonym rule can specify one or more other terms that should be present in the query for the synonym rule to apply. Furthermore, query contexts can specify relative locations for the other terms (e.g., to the right or left of a query term under evaluation). In another example, query contexts can specify a general location (e.g., anywhere in the query). For example, a particular synonym rule can specify that the term "pet" is a synonym for the query term "dog," but only when the query term "dog" is followed by the term "food" in the query. Multiple distinct synonym rules can generate the same synonym for a given query term. For example, for the query term "dog" in the query "dog food," the term "pet" can be specified as a synonym for "dog" by both a synonym rule for "dog" in the general context and a synonym rule for "dog" when followed by "food."

The synonym rules can depend on query contexts that define other terms in the original search query 105. In other words, a synonym rule need not apply in all situations. For example, when the term "cats" is used as a single-term query, the term "felines" can be considered a synonym for "cats". The synonym engine 180 can return the term "felines" to the query reviser engine 170 to generate a revised search query. In another example, when the query includes the term "cats" followed by the term "musical," a synonym rule can specify that the term "felines" is not a synonym for "cats." In some implementations, the synonym rules can be stored in the synonym rules database 185 for use by the synonym engine 180, the query reviser engine 170, or the search engine 150.

In the illustrative example of FIG. 1, the search system 130 can be implemented as computer programs installed on one or more computers in one or more locations that are coupled to each other through a network (e.g., network 120). The search system 130 includes a search system front-end 140 (e.g., a "gateway server") that coordinates requests between other parts of the search system 130 and the client device 110. The search system 130 also includes one or more "engines": the search engine 150, a query reviser engine 170, and the synonym engine 180.

As used in this specification, an "engine" (or "software engine") refers to a software implemented input/output system that provides an output that is different from the input. An engine can be an encoded block of functionality, such as a library, a platform, a Software Development Kit ("SDK"), or an object. The network 120 can include, for example, a wireless cellular network, a wireless local area network (WLAN) or Wi-Fi network, a Third Generation (3G) or Fourth Generation (4G) mobile telecommunications network, a wired Ethernet network, a private network such as an intranet, a public network such as the Internet, or any appropriate combination thereof.

The search system front-end 140, the search engine 150, the query reviser engine 170, and the synonym engine 180 can be implemented on any appropriate type of computing device (e.g., servers, mobile phones, tablet computers, notebook computers, music players, e-book readers, laptop or desktop computers, PDAs, smart phones, or other stationary or portable devices) that includes one or more processors and computer readable media. Among other components, the client device 110 includes one or more processors 112, computer readable media 113 that store software applications 114 (e.g., a browser or layout engine), an input module 116 (e.g., a keyboard or mouse), a communication interface 117, and a display device 118. The computing device or devices that implement the search system front-end 140, the query reviser engine 170, and the search engine 150 may include similar or different components.

In general, the search system front-end 140 receives the original search query 105 from the client device 110. The search system front-end 140 routes the original search query 105 to the appropriate engines included in the search system 130 so that the search system 130 can generate the search results page 155. In some implementations, routing occurs by referencing static routing tables. In other implementations, routing occurs based on the current network load of an engine, in order to accomplish load balancing. In addition, the search system front-end 140 can provide the resulting search results page 155 to the client device 110. In doing so, the search system front-end 140 acts as a gateway, or interface, between the client device 110 and the search engine 150.

Two or more of a search system front-end, a query reviser engine and a search engine (e.g., the search system front-end 140, the query reviser engine 170, and the search engine 150, respectively) may be implemented on the same computing device, or on different computing devices. Because the search system 130 generates the search results page 155 based on the collective activity of the search system front-end 140, the query reviser engine 170, and the search engine 150, the user of the client device 110 may refer to these engines collectively as a "search engine." This specification, however, refers to the search engine 150, and not the collection of engines, as the "search engine," since the search engine 150 identifies the search results 145 in response to the user-submitted query 105.

In some implementations, the search system 130 can include many computing devices for implementing the functionality of the search system 130. The search system 130 can process the received queries and generate the search results by executing software on the computing devices in order to perform the functions of the search system 130.

Referring to FIG. 1, during state (A), a user of the client device 110 enters original search query terms 115 for the original search query 105, and the client device 110 communicates the original search query 105 to the search system 130 over the network 120. For example, the user can submit the original search query 105 by initiating a search dialogue on the client device 110, speaking or typing the original search query terms 115 of the original search query 105, and then pressing a search initiation button or control on the client device 110. The client device 110 formulates the original search query 105 (e.g., by specifying search parameters). The client device 110 transmits the original search query 105 over the network 120 to the search system 130.

Although this specification refers to the query 105 as an "original" or an "initial" query, such reference is merely intended to distinguish this query from other queries, such as the revised queries that are described below. The designation of the original search query 105 as "original" is not intended to require the original search query 105 to be the first query that is entered by the user, or to be a query that is manually entered. For example, the original search query 105 can be the second or subsequent query entered by the user. In another example, the original search query 105 can be automatically derived (e.g., by the query reviser engine 170). In another example, the original search query 105 can be modified based on prior queries entered by the user, location information, and the like.

During state (B), the search system front-end 140 receives the original search query 105 and communicates the original search query 105 to the query reviser engine 170. The query reviser engine 170 can generate one or more revised queries 135 based on the substance of the original search query 105. In some implementations, the query reviser engine 170 generates a revised search query by adding terms to the original search query 105 using synonyms 125 for terms in the original search query 105. In other implementations, the query reviser engine 170 generates a revised search query by substituting the synonyms 125 for the corresponding terms of the original search query 105. The query reviser engine 170 can obtain synonyms 125 for use in revising the original search query 105 from the synonym engine 180.

During state (C), the query reviser engine 170 communicates original search query terms 115 of the original search query 105 to the synonym engine 180. The synonym engine 180 can use synonym rules included in the synonym rules database 185 to determine one or more synonyms 125 for one or more of the original search query terms 115 of the original search query 105.

The synonym engine 180 communicates synonyms 125 to the query reviser engine 170 during state (D). The query reviser engine 170 generates one or more revised queries 135 by adding synonyms 125 to the original search query 105. In addition, the query reviser engine 170 can generate one or more revised queries 135 by substituting certain terms of the original search query 105.

The query reviser engine 170 communicates the one or more revised queries 135 to the search system front-end 140 during state (E). The search system front-end 140 communicates the original search query 105 along with the one or more revised queries 135 to the search engine 150 as all queries 137 during state (F). The search engine 150 generates search results 145 that it identifies as being responsive to the original search query 105 and/or the one or more revised queries 135. The search engine 150 can identify search results 145 for each query using an index database 160 that stores indexed resources (e.g., web pages, images, or news articles on the Internet). The search engine 150 can combine and rank the identified search results 145 and communicate the search results 145 to the search system front-end 140 during state (G).

The search system front-end 140 generates a search results page 155 that identifies the search results 145. For example, each of the search results 145 can include, but are not limited to, titles, text snippets, images, links, reviews, or other information. The original search query terms 115 or the synonyms 125 that appear in the search results 145 can be formatted in a particular way (e.g., in bold print and/or italicized print). For example, the search system front-end 140 transmits a document that includes markup language (e.g., HyperText Markup Language or eXtensible Markup Language) for the search results page 155 to the client device 110 over the network 120 at state (H). The client device 110 reads the document (e.g., using a web browser) in order to display the search results page 155 on display device 118. The client device 110 can display the original search query terms 115 of the original search query 105 in a query box (or "search box"), located, for example, on the top of the search results page 155. In addition, the client device 110 can display the search results 145 in a search results box, for example, located on the left-hand side of the search results page 155.

Figure 2:
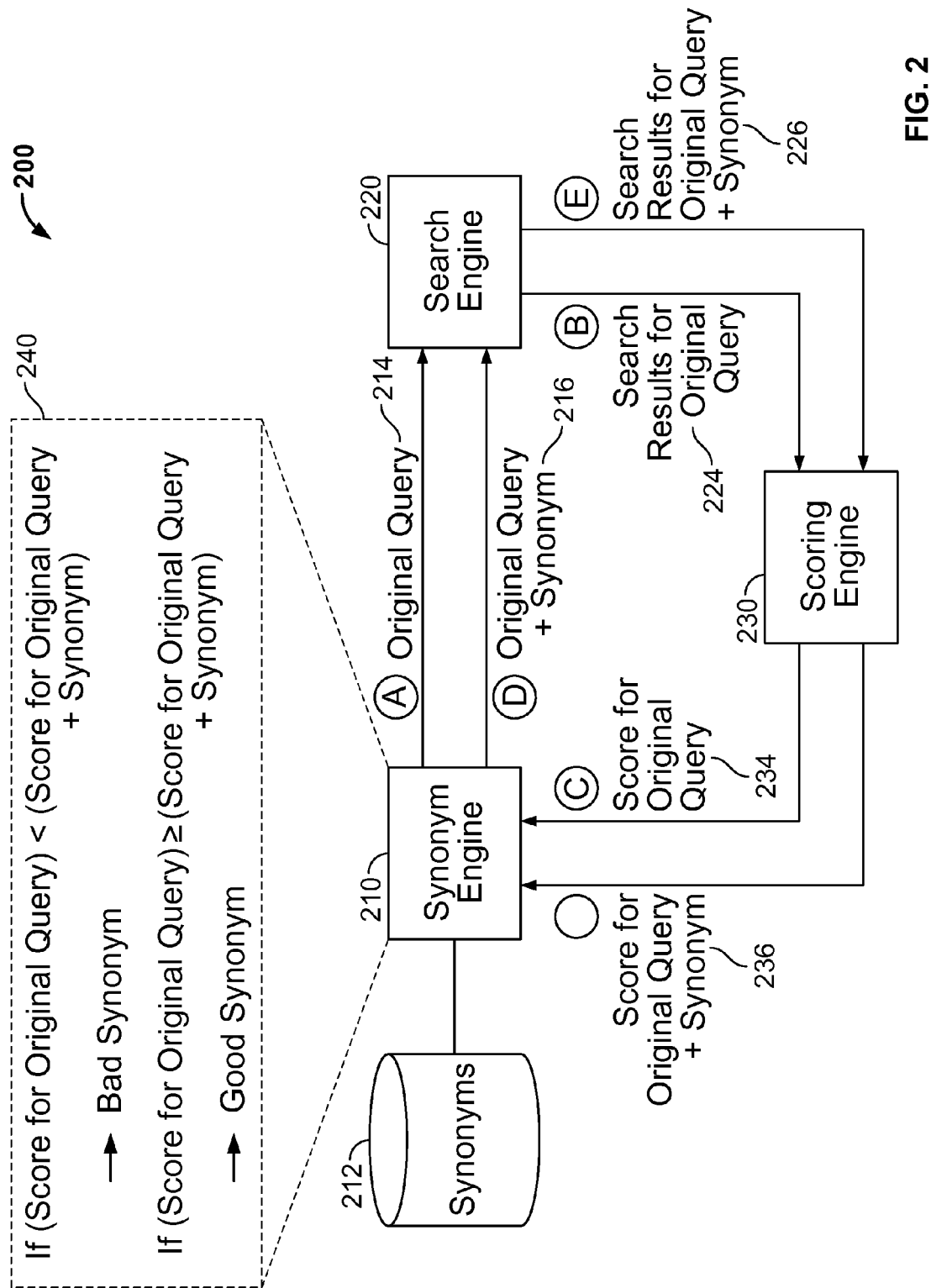
FIG. 2 is a block diagram of an example system that can evaluate query revisions.

FIG. 2 is a block diagram of an example system 200 that can evaluate query revisions, for example, using search result scores. In general, the system 200 includes a synonym engine 210, a search engine 220, and a scoring engine 230. The synonym engine 210 communicates queries to the search engine 220. The search engine 220 identifies and ranks responsive search results and provides the search results to the scoring engine 230. The scoring engine 230 can determine a search results score for search results received from the search engine 220, and can communicate the search results score to the synonym engine 210. The synonym engine 210 can evaluate search result scores received from the scoring engine 230. In some implementations, the synonym engine 210 compares a search results score received for a first collection of search results for an original search query and a search results score received for a second collection of search results for a revised search query to evaluate query revision. In some implementations, the original search query is revised to include one or more candidate synonyms for one or more original search query terms.

Referring to FIG. 2, during state (A), the synonym engine 210 communicates an original search query 214 to the search engine 220. The original search query 214 can be a query that is made up of one or more query terms. The search engine 220 can identify and rank search results 224 responsive to the original search query 214.

The search engine 220 communicates the identified search results 224 to the scoring engine 230 during state (B). In some implementations, the search engine 220 communicates a popularity score (e.g., an information retrieval score or other quality metric) corresponding to the original search query 214 and each search result, if such a score is available, with the identified search results 224. The popularity score corresponding to a particular search query and a particular search result can be determined based on user selections that were received for the search result in response to the particular search query. Depending on the configuration of the system, one or more of a mouse rollover, a click, a click of at least a certain duration, or a click of at least a certain duration relative to a resource length, for example, may be treated by the system as being a user selection. In particular, the popularity score reflects the popularity of the search result in the context of the original search query 214. The search engine 220 can use the popularity scores to order the presentation of the search results in descending order of popularity score to reflect an ideal ordering.

For example, search results X, Y, and Z, having popularity scores 0.8, 0.3, and 0.5, respectively, can be ideally ordered as X, Z, and Y, because X has the highest popularity score, Z has the next highest popularity score, and Y has the third highest popularity score. In another example, search results A, B, and C, having popularity scores 0.3, 0.7, and a null score (reflecting that a score is not available), respectively, can be ordered as B, A, and C, because B has the highest popularity score, A has the next highest popularity score, and because here C has no available score. The ordering of search results by popularity score can allow results that are known to be popular to be displayed before less popular results, or results whose popularity is uncertain.

The search engine 220 can also communicate ranking information for the identified search results 224 to the scoring engine 230. For example, if search results are ranked in a particular order, then the search engine 220 can communicate information indicating the positions in which each result is ranked.

In some implementations, the scoring engine 230 can produce a search results score using popularity scores and ranking information associated with the identified search results 224. In some implementations, the scoring engine 230 produces a search results score by determining a position score for one or more search results, where the position score is computed by multiplying a search result ranking position with a popularity score for that search result, and by combining the position scores determined for the search results. In some other implementations, position scores are not determined for search results that do not have an associated popularity score.

In some implementations, the position score for one or more search results is determined by transforming search result ranking positions for the search results and multiplying the transformed search result ranking positions with their respective popularity score for that search result. In some implementations, a search result ranking position is transformed by raising the search result ranking position to a power that is greater than zero and less than one, e.g., 0.1, 0.5, 0.7, or 0.9. In some other implementations, a search result ranking position is transformed by taking the square root of the search result ranking position.

In some implementations, the position score for one or more search results is determined by transforming popularity scores for search results and multiplying the transformed popularity scores for search results with their respective search result ranking positions. In some implementations, popularity scores for search results are transformed based on a threshold value, where popularity scores that do not satisfy the threshold value remain the same, and where popularity scores that satisfy the threshold value are set to a transformed value. In some implementations, the transformed value is equal to the threshold value.

The scoring engine 230 communicates the search results score 234 for the original search query 214 to the synonym engine 210 during state (C). The search results score 234 can be used for comparison against search results scores for other queries, or for revised versions of the original search query 214. In particular, the comparison of search results scores can be used to measure differences in the popularity and ranking of search results identified for the original search query 214 and search results identified for revised queries.

In some implementations, the synonym engine 210 can generate a revised search query 216 by adding to the original search query 214 additional terms that are candidate synonyms of one or more terms that occur in the original search query 214. In other implementations, the synonym engine 210 can generate a revised search query 216 by substituting terms that are candidate synonyms of terms that occur in the original search query 210, in place of the terms in the original search query 210. In some implementations, the synonym engine 210 can obtain candidate synonyms from a synonym database 212.

The synonym engine 210 communicates the revised search query 216 to the search engine 220 during state (D). The search engine 220 can identify and rank search results responsive to the revised search query 216.

The search engine 220 communicates the identified search results 226 for the revised search query 216 to the scoring engine 230 during state (E). In some implementations, the search engine 220 communicates a popularity score corresponding to each identified search result, if such a popularity score is available. In particular, the popularity score can be used to measure the popularity of the search result in the context of the revised search query 216. The search engine 220 can use the popularity scores to order the presentation of the search results in descending order of popularity score to reflect an ideal ordering. The search engine 220 can also communicate ranking information for the identified search results 226 to the scoring engine 230.

In some implementations, the scoring engine 230 can produce a search results score using popularity scores and ranking information associated with the identified search results 226. In some implementations, the scoring engine 230 produces a search results score by determining a position score for one or more search results, where the position score is computed by multiplying a search result ranking position with a popularity score for that search result, and by combining the position scores determined for the search results. In some other implementations, position scores are not determined for search results that do not have an associated popularity score.

The scoring engine 230 communicates the search results score 236 for the revised search query 216 to the synonym engine 210 during state (F). The search results score 236 can be used for comparison against search results scores for other queries. In particular, the comparison of search results scores can be used to measure differences in the popularity and ranking of search results identified for the original search query 214 and search results identified for the revised search query 216. In some implementations, the search results score 224 for the original search query 214 is compared to the search results score 226 for the revised search query 216 to determine whether the revision made to the revised search query was a good revision or a bad revision.

One example pseudo-code 240 for evaluating query revision is presented in dotted box 240. In evaluating query revision, the system can compare a search results score for an original search query and a search results score for a revised search query to determine whether a candidate synonym has a positive impact on search results or whether the candidate synonym has no impact, or a negative impact on search results. In some implementations, a synonym is determined to have a negative impact on search results if a search results score for an original search query is less than a search results score for a revised search query that includes a synonym. Additionally, a synonym is determined to have a positive impact on search results if a search results score for an original search query is greater than a search results score for a revised search query that includes a synonym. Moreover, a synonym is determined to have no impact on search results if a search results score for an original search query is greater than a search results score for a revised search query that includes a synonym.

A candidate synonym that is determined to have a positive impact, or no impact, on search results can be designated as a synonym for the corresponding query term or terms of the original search query. A candidate synonym that is determined to have a negative impact on search results can be flagged as a non-synonym for the corresponding query term or terms of the original search query.

Figure 3:
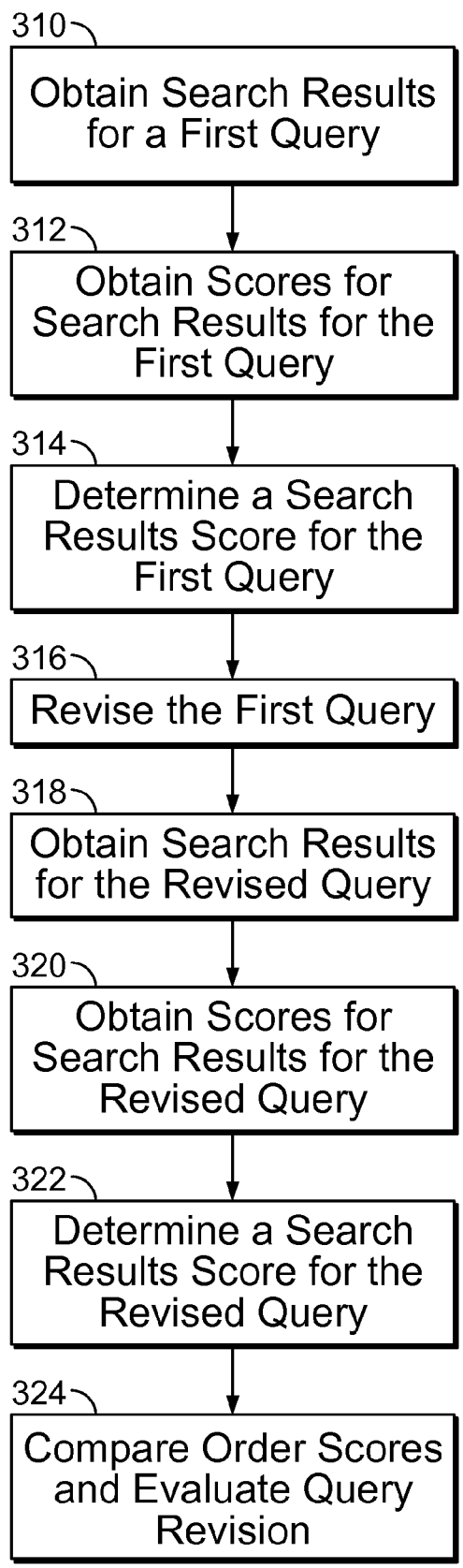
FIG. 3 is a flow diagram illustrating an example process for evaluating query revision.

FIG. 3 is a flow diagram illustrating an example process for evaluating query revision. The process 300 can be performed by a computer system including one or more computers, such as, for example, the search system 130, as shown in FIG. 1.

The system obtains search results for a first search query (310). The system obtains popularity scores for search results that were obtained for the first search query (312). A popularity score can be used to measure the popularity of the search result in the context of the first search query. In some implementations, a popularity score can correspond to each search result in the obtained search results, provided such a score is available. The popularity scores can be used to order the presentation of the search results in descending order of popularity score to reflect an ideal ordering.

For example, search results X, Y, and Z, having popularity scores 0.8, 0.3, and 0.5, respectively, can be ordered as X, Z, and Y, where X has the highest popularity score, where Z has the next highest popularity score, and where Y has the next highest popularity score. In another example, search results A, B, and C, having popularity scores 0.3, 0.7, and no available score, respectively, can be ordered as B, A, and C, where B has the highest popularity score, where A has the next highest popularity score, and where C has no popularity score. The ordering of search results by popularity score can allow more popular results to be displayed before less popular results.

In some implementations, ranking information corresponding to the obtained search results can also be obtained. For example, if search results X, Y, and Z are ranked in that order, then information indicating that result X is at position 1, that result Y is at position 2, and that result Z is at position 3 can be obtained.

The system determines a search results score for search results that were obtained for the first search query (314). In some implementations, the system can determine a search results score using popularity scores and ranking information associated with the search results obtained for the first search query. In some implementations, the system produces a search results score by determining a position score for one or more search results, where the position score is computed by multiplying a search result ranking position with a popularity score for that search result, and by combining the position scores determined for the search results.

By way of illustration, search results information in Table 1 depicts example search results responsive to a query, corresponding ranking positions, corresponding Popularity scores, and determined position scores.

TABLE 1

| SEARCH RESULT | RANKING POSITION | POPULARITY SCORE | POSITION SCORE (RANKING POSITION × POPULARITY SCORE) |
|---|---|---|---|
| Result W | 1 | 0.8 | 1 × 0.8 = 0.8 |
| Result X | 2 | 0.5 | 2 × 0.5 = 1.0 |
| Result Y | 3 | 0.3 | 3 × 0.3 = 0.9 |
| Result Z | 4 | 0.1 | 4 × 0.1 = 0.4 |

As shown in TABLE 1, search results W, X, Y, and Z have popularity scores 0.8, 0.5, 0.3, and 0.1, respectively. The position scores for search results W, X, Y, and Z are determined by multiplying the ranking position of that search result and its corresponding popularity score. Accordingly, the position scores for search results W, X, Y, and Z are 0.8, 1.0, 0.9, and 0.4, respectively.

By way of further illustration, search results information in TABLE 2 depicts example search results from TABLE 1 with their corresponding position scores and a computed search results score for the search results.

TABLE 2

| RESULT W POSITION SCORE | RESULT X POSITION SCORE | RESULT Y POSITION SCORE | RESULT Z POSITION SCORE | SEARCH RESULTS SCORE |
|---|---|---|---|---|
| 0.8 | 1.0 | 0.9 | 0.4 | 3.1 |

As shown in TABLE 2, the search results score is determined by combining the determined position scores. In some other implementations, position scores are not determined for search results that do not have an associated popularity score.

Popularity scores and ranking information corresponding to a collection of search results can vary depending on the query. For example, search results X, Y, and Z may be identified for a first search query. Similarly, the same search results X, Y, and Z may also be identified for a revised search query. However, the popularity scores and/or ranking information corresponding to search results X, Y, and Z can differ for the first search query and for the revised search query, such that the system can produce different search results scores for the first search query and for the revised search query.

The system revises the first search query (316). In some other implementations, the system can generate a revised search query by revising a first search query to add or substitute terms or operands. For example, the system can revise a first search query for "banana smoothie" by adding quotations around query terms to produce a revised search query for '"banana smoothie plantain".' By comparing the search results of the first search query for "banana smoothie" with the search results for the revised search query for '"banana smoothie plantain,"' (in quotations) the system can determine whether the addition of quotations was a good query revision.

In another example, a first search query for "jaguar cat" can be revised by adding exclusionary query terms to produce a revised search query for "jaguar cat -car -football" to eliminate search results that contain references to "car" and "football." By comparing the search results of the first search query for "jaguar cat" with the search results for the revised search query for "jaguar cat -car -football," the system can determine whether the addition of exclusionary query terms was a good query revision In some other implementations, the system can generate a revised search query by adding to the first search query candidate synonyms for one or more terms that occur in the first search query. The system can use specified synonym rules to identify candidate synonyms. For example, the system can revise a first search query for "banana smoothie" by adding candidate synonym "plantain" to produce a revised search query for "banana smoothie plantain." By comparing the search results of the first search query for "banana smoothie" with the search results for the revised search query for "banana smoothie plantain," the system can determine whether the addition of the candidate synonym "plantain" was a good query revision.

In yet some other implementations, the system can generate a revised search query by substituting terms that occur in the first search query with candidate synonyms. For example, the system can revise a first search query for "banana smoothie" by substituting candidate synonym "plantain" for the query term "banana," to produce a revised search query for "plantain smoothie." By comparing the search results of the first search query for "banana smoothie" with the search results for the revised search query for "plantain smoothie," the system can determine whether the substitution of the candidate synonym "plantain" was a good query revision.

The system obtains search results for the revised search query (318). The system can identify and rank search results responsive to the revised search query.

The system obtains popularity scores for search results for the revised search query (320). A popularity score can be used to measure the popularity of the search result in the context of the revised search query. In some implementations, a popularity score can correspond to each search result in the obtained search results, provided such a score is available. The popularity scores can be used to order the presentation of the search results in descending order of popularity score to reflect an ideal ordering.

In some implementations, ranking information corresponding to the obtained search results can also be obtained. For example, if search results X, Y, and Z are ranked in that order, then information indicating that result X is at position 1, that result Y is at position 2, and that result Z is at position 3 can be obtained.

The system determines a search results score for search results for the revised search query (322). In some implementations, the system can determine a search results score using popularity scores and ranking information associated with the search results obtained for the revised search query. In some implementations, the system produces a search results score by determining a position score for one or more search results, where the position score is computed by multiplying a search result ranking position with a popularity score for that search result, and by combining the determined position scores.

By way of illustration, search results information in Table 3 depicts example search results responsive to a revised query, corresponding ranking positions, corresponding popularity scores, and determined position scores.

TABLE 3

| SEARCH RESULT | RANKING POSITION | POPULARITY SCORE | POSITION SCORE (RANKING POSITION × POPULARITY SCORE) |
| --- | --- | --- | --- |
| Result W | 1 | 0.6 | 1 × 0.6 = 0.6 |
| Result P | 2 | 0.3 | 2 × 0.3 = 0.6 |
| Result Q | 3 | 0.1 | 3 × 0.1 = 0.3 |
| Result Z | 4 | — | — |

As shown in Table 3, search results W, P, and Q have popularity scores 0.6, 0.3, and 0.1, respectively, while search result Z has no associated popularity score. The position scores for search results W, P, and Q are determined by multiplying the ranking position of that search result and its corresponding popularity score. Accordingly, the position scores for search results W, P, and Q are 0.6, 0.6, and 0.3, respectively. A position score for search result Z is not determined since search result Z has no associated popularity score.

By way of further illustration, search results information in Table 4 depicts example search results from Table 3 with their corresponding position scores and a computed search results score for the search results.

TABLE 4

| RESULT W POSITION SCORE | RESULT P POSITION SCORE | RESULT Q POSITION SCORE | RESULT Z POSITION SCORE | SEARCH RESULTS SCORE |
| --- | --- | --- | --- | --- |
| 0.6 | 0.6 | 0.3 | — | 1.5 |

As shown in Table 4, the search results score is determined by combining the determined position scores. In some other implementations, position scores are not determined for search results that do not have an associated popularity score. In some implementations, the search results score can be adjusted to exclude position scores of search results that do not have a popularity score in connection with the original search query or the revised search query. For example, in a case where a first search query has search results X, Y, and Z with popularity scores 0.5, 0.4, and 0.2, respectively, and a corresponding revised search query has search results X, Y, and Z with popularity scores 0.3, 0.2, and no associated popularity score, respectively, the system can adjust the search results score for the first search query to exclude search result Z from the calculation, since search result Z has no popularity score in connection with the revised search query. Similarly, in a case where a first search query has search results X, Y, and Z with popularity scores 0.5, 0.4, and no popularity score, respectively, and a corresponding revised search query has search results X, Y, and Z with popularity scores 0.3, 0.2, and 0.1, respectively, the system can adjust the search results score for the revised search query to exclude search result Z from the calculation, since search result Z has no popularity score in connection with the original search query.

The system compares search results scores for the first search query and the revised search query to evaluate the query revision (324). In evaluating query revision, the system can compare the search results score for the first search query and the search results score for the revised search query to determine whether the query revision was a good revision or a bad revision. In some implementations, the system determines a revision score by subtracting the search results score for the first search query from the search results score for the revised search query. The quality of the revision is determined based on whether the revision score satisfies a specified threshold.

In some implementations, a query revision can be determined to be a good revision if a revision score satisfies a specified threshold value. In some other implementations, a query revision can be determined to be a good revision if a revision score meets or exceeds 0. For example, a search results score for a first search query of 1.4 and a search results score for a revised search query of 1.3 yields a revision score of +0.1, which indicates that the query revision produced better results than the unrevised search query. Similarly, a query revision can be determined to be a bad revision if a revision score is below 0. For example, a search results score for a first search query of 1.3 and a search results score for a revised search query of 1.4 yields a revision score of –0.1, which indicates that the query revision produced worse results than the unrevised search query.

In some implementations, the quality of a query revision can be determined based on the quality of search results that are obtained in response to the revised search query, without a need for human feedback or rating of the search results. For example, the system can determine a search results score for the search results that are obtained for the revised search query and, based on that determination, determine whether or not a query revision is a good revision, without a need for human feedback or rating of the search results. In some implementations, a query revision can be determined to be a good revision if a revision score satisfies a specified threshold value. In some other implementations, a query revision can be determined to be a good revision if a revision score meets or exceeds 0.

In some implementations, the quality of a candidate synonym included in a revised search query can be determined based on a quality of search results that are obtained in response to a revised search query that contains the candidate synonym, without a need for human feedback or rating of the search results. For example, the system can determine a search results score for the search results that are obtained for the revised search query and, based on that determination, determine whether or not a candidate synonym included in the revised search query is a good candidate synonym, without a need for human feedback or rating of the search results. In some implementations, a candidate synonym included in a revised search query can be determined to be a good candidate synonym if a revision score satisfies a specified threshold value. In some other implementations, a candidate synonym included in a revised search query can be determined to be a good candidate synonym if a revision score meets or exceeds 0.

Figure 4:
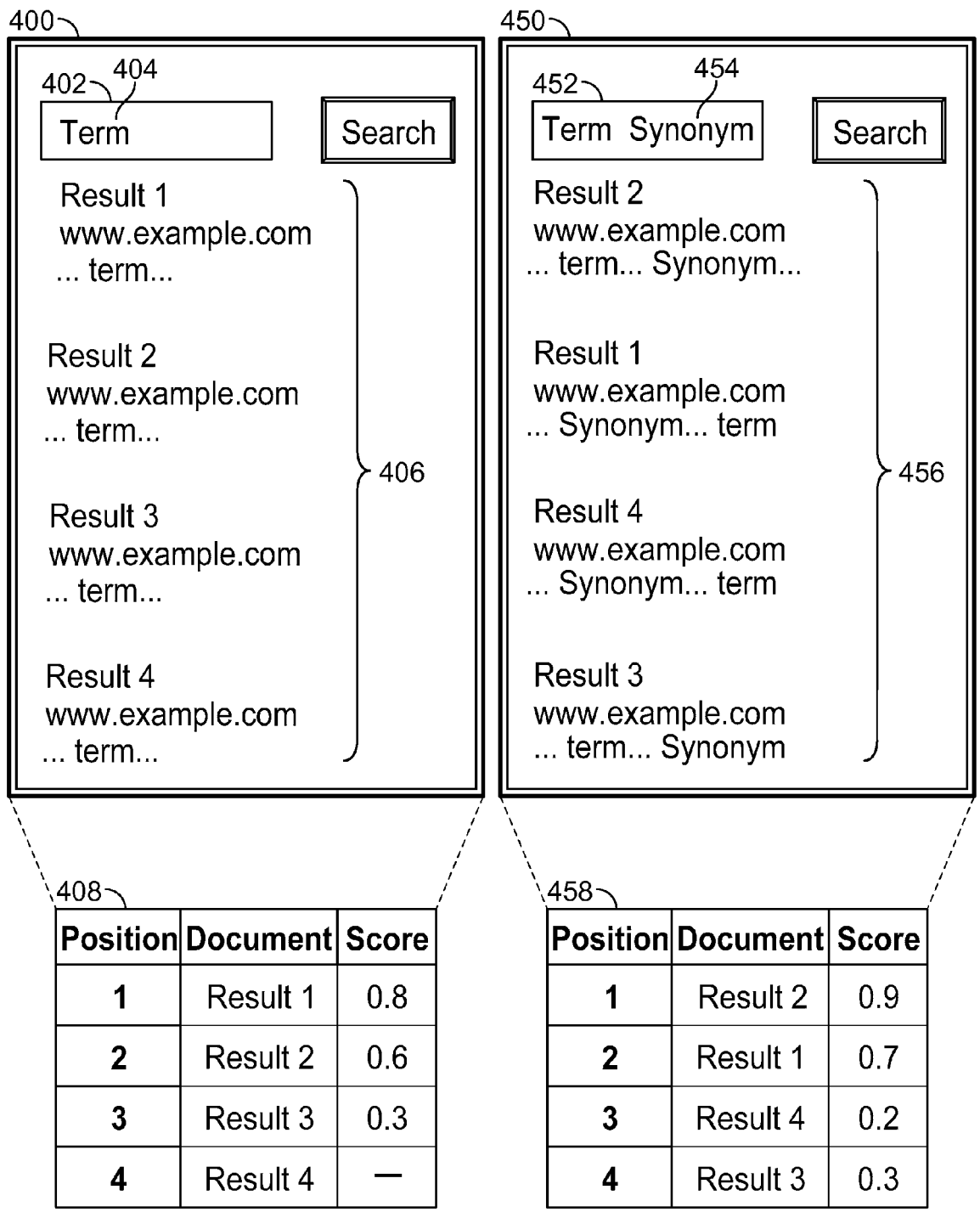
FIG. 4 is a view illustrating synonym identification based on evaluation of search quality.

FIG. 4 is a view illustrating synonym identification based on evaluation of search quality. The user interface 400 includes a query box 402, query terms 404, and search results 406. As shown, the query box 402 is populated with a query term 404 ("Term"), and the search results 406 displayed are responsive to the original search query 404. In particular, search results 406 display "Result 1," "Result 2," "Result 3," and "Result 4," respectively. A table 408 reflects ranking information and popularity scores associated with the search results 406. As shown in table 408, "Result 1" is displayed at position 1 with a popularity score of 0.8, "Result 2" is displayed at position 2 with a popularity score of 0.6, "Result 3" is displayed at position 3 with a popularity score of 0.3, and "Result 4" is displayed at position 4 with no associated popularity score.

In some implementations, a search results score can be determined using popularity scores and ranking information associated with the search results 406. In particular, a search results score can be determined by determining a position score for each search result and by combining the determined position scores. A position score can be determined by multiplying a search result ranking position with a corresponding popularity score. For example, a position score for "Result 1," which is displayed at position 1 with a popularity score of 0.8, would be 0.8. Similarly, position scores for "Result 2" and "Result 3" would be 1.2 and 0.9, respectively. A position score is not determined for "Result 4" since "Result 4" has no associated popularity score. Accordingly, a search results score for the original search query 404 can be determined by combining the determined position scores for "Result 1," "Result 2," and "Result 3" (0.8+1.2+0.9) to produce a score of 2.9.

The user interface 450 includes a query box 452, query terms 454, and search results 456. As shown, the query box 452 is populated with query terms 454 ("Term Synonym"), where "Synonym" is a candidate synonym for query term "Term." The search results 456 displayed are responsive to the revised search query 454. A table 458 reflects position information and popularity scores associated with the search results 456. As shown in table 458, "Result 2" is displayed at position 1 with a popularity score of 0.9, "Result 1" is displayed at position 2 with a popularity score of 0.7, "Result 4" is displayed at position 3 with a popularity score of 0.2, and "Result 3" is displayed at position 4 with a popularity score of 0.3.

In particular, the search results 456 for the revised search query are the same as the search results 406 that were identified as being responsive to the original search query. However, as shown in table 458, the position and popularity scores associated with the search results 456 have changed with the inclusion of the candidate synonym "Synonym" to the original search query 404.

A search results score can be determined for the revised search query by determining a position score for each search result and by combining the determined position scores. A position score can be determined by multiplying a search result ranking position with a corresponding popularity score. For example, a position score for "Result 2," which is displayed at position 1 with a popularity score of 0.9, would be 0.9. Similarly, position scores for "Result 1," "Result 4," and "Result 3" would be 1.4, 0.6, and 1.2, respectively. Accordingly, a search results score for the revised search query 454 can be determined by combining the determined position scores for "Result 2," "Result 1," "Result 4," and "Result 3" (0.9+1.4+0.6+1.2) to produce a score of 4.1. In some implementations, the search results score can be adjusted to exclude position scores of search results that do not have a popularity score in connection with the original search query or the revised search query. For example, since "Result 4" did not have a popularity score associated with the search results 406 for the original search query 404, the search results score for the revised search query 454 can be adjusted to remove the position score for "Result 4." Accordingly, the adjusted search result score for the revised search query 454 is determined by combining the position scores for "Result 2," "Result 1," and "Result 3" (0.9+1.4+1.2) to produce a score of 3.5.

Identification of whether the candidate synonym ("Synonym") is a good synonym for the query term 404 ("Term") can be determined by subtracting the search results score for the original search query 404 ("Term") from the search results score for the revised search query 454 ("Term Synonym"). In some implementations, a candidate synonym is determined to be a good synonym if the difference in search result scores satisfies a specified threshold. In some implementations, a candidate synonym is determined to be a good synonym if the difference in search result scores meets or exceeds 0. In the example above, a difference in the search results score for the original search query 404 of 2.9 and the search results score for the revised search query 454 of 3.5 yields a revision score of −0.6, which indicates that inclusion of the candidate synonym produced worse results than the unrevised original search query 404 and therefore the candidate synonym ("Synonym") may not be a good synonym for the query term ("Term").

Figure 5:
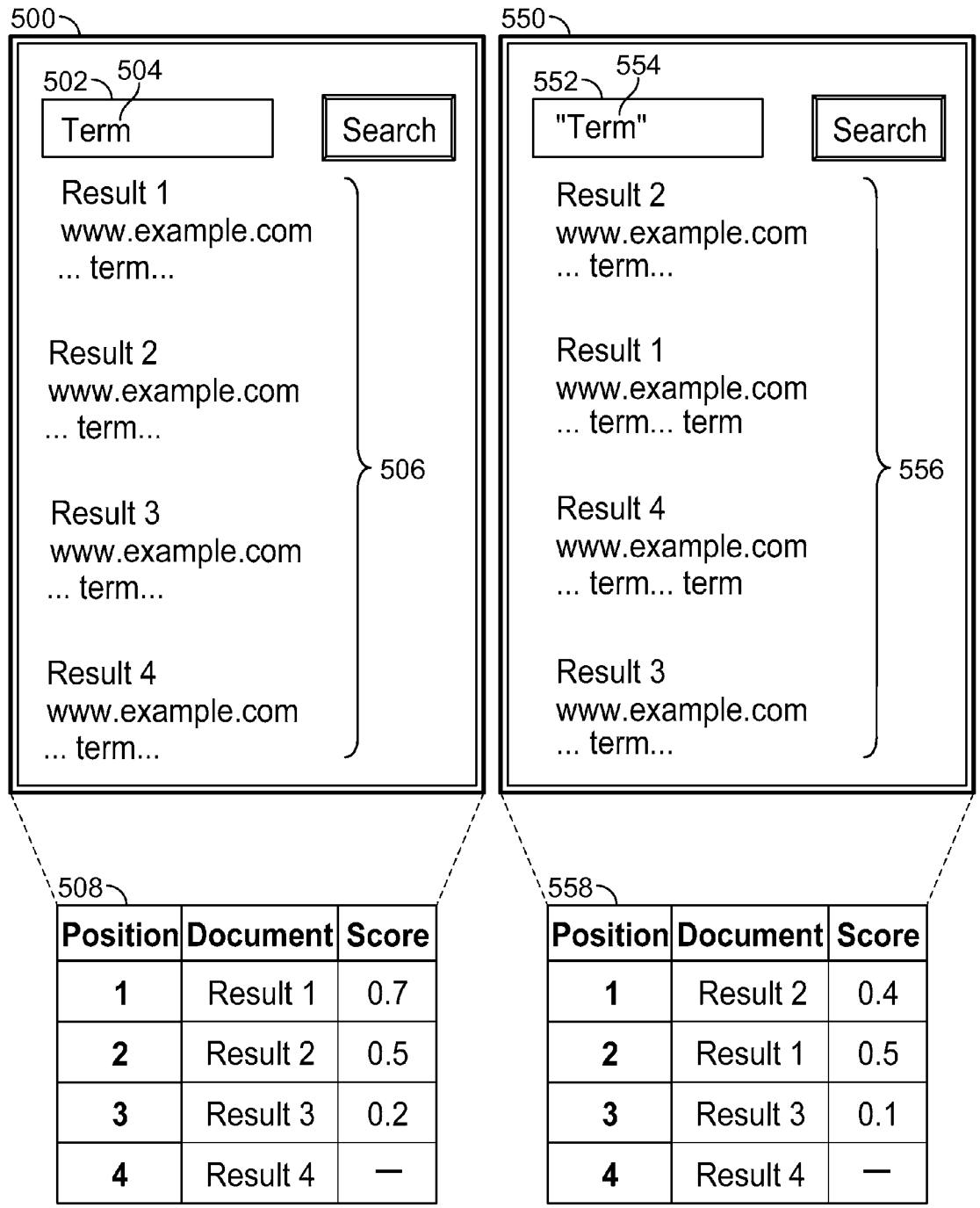
FIG. 5 is a view illustrating evaluation of an example query revision based on evaluation of search quality.

FIG. 5 is a view illustrating evaluation of an example query revision based on evaluation of search quality. The user interface 500 includes a query box 502, query terms 504, and search results 506. As shown, the query box 502 is populated with a query term 504 ("Term"), and the search results 506 displayed are responsive to the original search query 504. In particular, search results 506 display "Result 1," "Result 2," "Result 3," and "Result 4," respectively. A table 508 reflects ranking information and popularity scores associated with the search results 506. As shown in table 508, "Result 1" is displayed at position 1 with a popularity score of 0.7, "Result 2" is displayed at position 2 with a popularity score of 0.5, "Result 3" is displayed at position 3 with a popularity score of 0.2, and "Result 4" is displayed at position 4 with no associated popularity score.

In some implementations, a search results score can be determined using popularity scores and ranking information associated with the search results 506. In particular, a search results score can be determined by determining a position score for each search result and by combining the determined position scores. A position score can be determined by multiplying a search result ranking position with a corresponding popularity score. For example, a position score for "Result 1," which is displayed at position 1 with a popularity score of 0.7, would be 0.7. Similarly, position scores for "Result 2" and "Result 3" would be 1.0 and 0.6, respectively. A position score is not determined for "Result 4" since "Result 4" has no associated popularity score. Accordingly, a search results score for the original search query 504 can be determined by combining the determined position scores for "Result 1," "Result 2," and "Result 3" (0.7+1.0+0.6) to produce a score of 2.3.

The user interface 550 includes a query box 552, query terms 554, and search results 556. As shown, the query box 552 is populated with query terms 554 ("Term"), where the query term ("Term") is enclosed in quotation marks. The displayed search results 556 are responsive to the revised search query 554. A table 558 reflects position information and popularity scores associated with the search results 556. As shown in table 558, "Result 2" is displayed at position 1 with a popularity score of 0.4, "Result 1" is displayed at position 2 with a popularity score of 0.5, "Result 3" is displayed at position 3 with a popularity score of 0.1, and "Result 4" is displayed at position 4 with no associated popularity score.

In particular, the search results 556 for the revised search query are the same as the search results 506 that were identified as being responsive to the original search query 504. However, as shown in table 558, the position and popularity scores associated with the search results 556 have changed with the inclusion of quotation marks around the query term 554.

A search results score can be determined for the revised search query by determining a position score for each search result and by combining the determined position scores. A position score can be determined by multiplying a search result ranking position with a corresponding popularity score. For example, a position score for "Result 2," which is displayed at position 1 with a popularity score of 0.4, would be 0.4. Similarly, position scores for "Result 1" and "Result 3" would be 1.0 and 0.3, respectively. A position score for "Result 4" is not determined since "Result 4" has no associated popularity score. Accordingly, a search results score for the revised search query 554 can be determined by combining the determined position scores for "Result 2," "Result 1," and "Result 3" (0.4+1.0+0.3) to produce a score of 1.7.

Determining whether a query revision is a good revision for the original search query 504 can be accomplished by subtracting the search results score for the original search query 504 ("Term") from the search results score for the revised search query 554 ("Term"). In some implementations, a query revision is determined to be a good revision if the difference in search result scores satisfies a specified threshold. In some other implementations, a query revision is determined to be a good revision if the difference in search result scores meets or exceeds 0. In the example above, a difference in the search results score for the original search query 504 of 2.3 and the search results score for the revised search query 554 of 1.7 yields a revision score of +0.6, which indicates that inclusion of quotation marks around the query term 504 produced better results than the unrevised original search query 504 and therefore the inclusion of quotation marks around the query term 504 may be a good query revision.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:
1. A computer-implemented method comprising:
   determining, by operation of a system, a first search results score associated with first search results that were generated for an original search query that includes a first query term, wherein the first search results score is based on (i) a respective rank of each first search result, and (ii) a respective first popularity score associated with each first search result;

revising the search query to include a second query term;

determining a second search results score associated with second search results that were generated for the revised search query, wherein the second search results score is based on (i) a respective rank of each second search result, and (ii) a respective second popularity score associated with each second search result;

determining that a difference between the first search results score and the second search results score satisfies a specified threshold; and determining that, for the original search query, the second query term is a substitute for the first query term based on determining that the difference between the first search results score and the second search results score satisfies the specified threshold.

2. The method of claim 1, wherein the first search results that were generated for the original search query include:
i) ranking information associated with the first search results; and
ii) first popularity scores associated with the first search results, wherein a first popularity score reflects the popularity of a search result in connection with the original search query.

3. The method of claim 2, wherein the ranking information associated with the first search results includes a rank for each of the first search results, wherein the rank indicates a display order of a search result with respect to the first search results.

4. The method of claim 1, the second search results that were generated for the revised search query include:
i) ranking information associated with the second search results; and
ii) second popularity scores associated with the second search results, wherein a second popularity score reflects the popularity of a search result in connection with the revised search query.

5. The method of claim 4, wherein the ranking information associated with the second search results includes a rank for each of the second search results, wherein the rank indicates a display order of a search result with respect to the second search results.

6. The method of claim 1, wherein determining, by operation of a system, a first search results score associated with first search results that were generated for an original search query that includes a first query term, wherein the first search results score is based on (i) a respective rank of each first search result, and (ii) a respective first popularity score associated with each first search result comprises:
determining, for each search result in the first search results, a respective position score, the respective position score being a product of a rank of the search result and a popularity score associated with the search result; and
determining the first search results score based on a sum of the respective position scores for the first search results.

7. The method of claim 1, wherein determining a second search results score associated with second search results that were generated for the revised search query, wherein the second search results score is based on (i) a respective rank of each second search result, and (ii) a respective second popularity score associated with each second search result comprises:
determining, for each search result in the second search results, a respective position score, the respective position score being a product of a rank of the search result and a popularity score associated with the search result; and
determining the second search results score based on a sum of the respective position scores for the second search results.

8. The method of claim 1, further comprising:
storing the second query term as a synonym for the first query term.

9. A non-transitory computer storage medium encoded with instructions that when executed by one or more computers cause the one or more computers to perform operations comprising:
determining, by operation of a system, a first search results score associated with first search results that were generated for an original search query that includes a first query term, wherein the first search results score is based on (i) a respective rank of each first search result, and (ii) a respective first popularity score associated with each first search result;

revising the search query to include a second query term;

determining a second search results score associated with second search results that were generated for the revised search query, wherein the second search results score is based on (i) a respective rank of each second search result, and (ii) a respective second popularity score associated with each second search result;

determining that a difference between the first search results score and the second search results score satisfies a specified threshold; and determining that, for the original search query, the second query term is a substitute for the first query term based on determining that the difference between the first search results score and the second search results score satisfies the specified threshold.

10. The non-transitory computer storage medium of claim 9, wherein the first search results that were generated for the original search query include:
i) ranking information associated with the first search results; and
ii) first popularity scores associated with the first search results, wherein a first popularity score reflects the popularity of a search result in connection with the original search query.

11. The non-transitory computer storage medium of claim 10, wherein the ranking information associated with the first search results includes a rank for each of the first search results, wherein the rank indicates a display order of a search result with respect to the first search results.

12. The non-transitory computer storage medium of claim 9, the second search results that were generated for the revised search query include:
i) ranking information associated with the second search results; and
ii) second popularity scores associated with the second search results, wherein a second popularity score reflects the popularity of a search result in connection with the revised search query.

13. The non-transitory computer storage medium of claim 12, wherein the ranking information associated with the second search results includes a rank for each of the second search results, wherein the rank indicates a display order of a search result with respect to the second search results.

14. The non-transitory computer storage medium of claim 9, wherein determining, by operation of a system, a first search results score associated with first search results that were generated for an original search query that includes a first query term, wherein the first search results score is based on (i) a respective rank of each first search result, and (ii) a respective first popularity score associated with each first search result comprises:
- determining, for each search result in the first search results, a respective position score, the respective position score being a product of a rank of the search result and a popularity score associated with the search result; and
- determining the first search results score based on a sum of the respective position scores for the first search results.

15. The non-transitory computer storage medium of claim 9, wherein determining a second search results score associated with second search results that were generated for the revised search query, wherein the second search results score is based on (i) a respective rank of each second search result, and (ii) a respective second popularity score associated with each second search result comprises:
- determining, for each search result in the second search results, a respective position score, the respective position score being a product of a rank of the search result and a popularity score associated with the search result; and
- determining the second search results score based on a sum of the respective position scores for the second search results.

16. The non-transitory computer storage medium of claim 9, further comprising:
- storing the second query term as a synonym for the first query term.

17. A system comprising:
- one or more computers and one or more storage devices storing instructions that are operable, when executed by the one or more computers, to cause the one or more computers to perform operations comprising:
- determining, by operation of a system, a first search results score associated with first search results that were generated for an original search query that includes a first query term, wherein the first search results score is based on (i) a respective rank of each first search result, and (ii) a respective first popularity score associated with each first search result;
- revising the search query to include a second query term;
- determining a second search results score associated with the second search results that were generated for the revised search query, wherein the second search results score is based on (i) a respective rank of each second search result, and (ii) a respective second popularity score associated with each second search result;
- determining that a difference between the first search results score and the second search results score satisfies a specified threshold; and
- determining that, for the original search query, the second query term is a substitute for the first query term based on determining that the difference between the first search results score and the second search results score satisfies the specified threshold.

18. The system of claim 17, wherein the first search results that were generated for the original search query include:
- i) ranking information associated with the first search results; and
- ii) first popularity scores associated with the first search results, wherein a first popularity score reflects the popularity of a search result in connection with the original search query.

19. The system of claim 18, wherein the ranking information associated with the first search results includes a rank for each of the first search results, wherein the rank indicates a display order of a search result with respect to the first search results.

20. The system of claim 17, the second search results that were generated for the revised search query include:
- i) ranking information associated with the second search results; and
- ii) second popularity scores associated with the second search results, wherein a second popularity score reflects the popularity of a search result in connection with the revised search query.

21. The system of claim 20, wherein the ranking information associated with the second search results includes a rank for each of the second search results, wherein the rank indicates a display order of a search result with respect to the second search results.

22. The system of claim 17, wherein determining, by operation of a system, a first search results score associated with first search results that were generated for an original search query that includes a first query term, wherein the first search results score is based on (i) a respective rank of each first search result, and (ii) a respective first popularity score associated with each first search result comprises:
- determining, for each search result in the first search results, a respective position score, the respective position score being a product of a rank of the search result and a popularity score associated with the search result; and
- determining the first search results score based on a sum of the respective position scores for the first search results.

23. The system of claim 17, wherein determining a second search results score associated with second search results that were generated for the revised search query, wherein the second search results score is based on (i) a respective rank of each second search result, and (ii) a respective second popularity score associated with each second search result comprises:
- determining, for each search result in the second search results, a respective position score, the respective position score being a product of a rank of the search result and a popularity score associated with the search result; and
- determining the second search results score based on a sum of the respective position scores for the second search results.

24. The system of claim 17, further comprising:
- storing the second query term as a synonym for the first query term.

* * * * *